United States Patent [19]

Nakauchi et al.

[11] 4,295,138

[45] Oct. 13, 1981

[54] COMBINED CONSTANT POTENTIAL AND CONSTANT VOLTAGE DRIVING TECHNIQUE FOR ELECTROCHROMIC DISPLAYS

[75] Inventors: Hiroshi Nakauchi; Katubumi Koyanagi; Yasuhiko Inami, all of Tenri; Hisashi Uede, Yamatokoriyama, all of Japan

[73] Assignee: Sharp Corporation, Osaka, Japan

[21] Appl. No.: 94,933

[22] Filed: Nov. 16, 1979

Related U.S. Application Data

[63] Continuation of Ser. No. 873,504, Jan. 30, 1978, abandoned.

[30] Foreign Application Priority Data

Jan. 31, 1977 [JP] Japan .................................. 52-10120
Feb. 4, 1977 [JP] Japan .................................. 52-12350

[51] Int. Cl.³ ........................... G06F 3/14; G09F 9/32
[52] U.S. Cl. .................................... 340/785; 340/763; 340/811; 350/357

[58] Field of Search ................ 350/357; 340/785, 805, 340/763, 783, 811

[56] References Cited

U.S. PATENT DOCUMENTS

| | | | |
|---|---|---|---|
| 3,961,842 | 6/1976 | Jasinski | 340/785 |
| 4,057,739 | 11/1977 | Otake | 340/785 |
| 4,092,637 | 5/1978 | Barclay et al. | 340/785 |
| 4,222,431 | 10/1980 | Barclay et al. | 340/785 |

*Primary Examiner*—Marshall M. Curtis
*Attorney, Agent, or Firm*—Birch, Stewart, Kolasch & Birch

[57] ABSTRACT

A combined constant potential and constant voltage driving technique is utilized which is much more effective to drive an electrochromic display. The electrochromic display manifests the electrochromic phenomenon to place the display in a colored state or a bleached state in response to current applied thereto. A constant potential driving manner is employed in coloring the electrochromic display, while a constant voltage driving manner is employed in bleaching the same.

9 Claims, 5 Drawing Figures

COMBINED CONSTANT POTENTIAL AND CONSTANT VOLTAGE DRIVING TECHNIQUE FOR ELECTROCHROMIC DISPLAYS

This application is a continuation, of copending application Ser. No. 873,504, filed on Jan. 30, 1978, abandoned.

BACKGROUND OF THE INVENTION

The present invention relates to a method of driving an electorchromic display (referred to as "ECD" hereinafter).

An ECD is well known in the art of display together with its basic scheme, attendant features and basic driver circuit. See, for example, L. A. Goodman, "Passive Liquid Displays", RCA Report 613258.

Accordingly, it is an object of the present invention to provide an ECD driving technique which eliminates nonuniformity in a visual display in coloring and bleaching modes to enhance the quality of the electrochromic display in an ECD.

SUMMARY OF THE INVENTION

To achieve the above noted object, the present invention provides a combined constant potential and constant voltage driving technique for an ECD. According to the present invention, a constant potential driving manner is carried out by coloring an ECD, while a constant voltage driving manner is carried out by bleaching an ECD. The constant potential driving manner requires a reference electrode and a high gain, linear amplifier. While current flows from a counter electrode to one or more segment electrodes, the degree of a redox reaction occurring about the interface with the counter electrode is varied in accordance with the number of the segment electrodes being colored. However, a potential difference about the segment interfaces is of great importance where it is desired to color the ECD. The constant potential driving manner maintains at a fixed value the potential difference adjacent the segment interfaces which is necessary and important for display purposes by the employment of a reference electrode and a linear amplifier. At the same time, the degree of the redox reaction about the interface with the counter electrode is varied with an accompanying variation in a potential difference about that interface. The constant voltage driving manner is employed in bleaching the ECD and is very effective to ECDs in using $WO_3$ layers and transition metal oxides. In other words, where an ECD includes a $WO_3$ layer or a $MoO_3$ layer, it shows a low resistance in coloring and a high resistance in bleaching. Therefore, where the constant voltage driving manner is used to bleach an ECD as taught by the present invention, upon terminating the bleaching procedure, current no longer flows through the segment electrodes which have been bleached and placed into the high resistance state. This precludes the occurrence of any difference in the degree of bleaching the $WO_3$ or the $MoO_3$ layer However, for the constant voltage technique if a fixed voltage is applied to the counter electrode in the coloring mode, the potential difference about the interface with the counter electrode will be varied in accordance with the number of the segment electrodes being colored as discussed above. This implies that the potential difference about the interface with the segment electrodes also is varied correspondingly. Such potential difference will cause an appreciable difference in a degree of coloring.

The combined constant potential and constant voltage driving technique as taught by the present invention is superior to the constant potential driving technique where the constant potential driving technique is carried out in both the coloration and bleaching modes. That is, the former can alleviate the influence of input bias current upon the linear amplifier. In general, the reference electrode is connected to a negative input of the linear amplifier so that the input bias current to the linear amplifier also flows directly through the reference electrode, causing a variation in a potential about the interface with the reference electrode which is disagreeable with the constant potential driving technique. The greater the bias current the greater a variation in a degree of coloring as a function of time. However, if as suggested by the present invention the constant potential driving technique is employed only in the coloring mode and the operation of the linear amplifier is suppressed. Without the flow of the bias current in all other circumstance, there is a likelihood of reducing and minimizing the influence of the bias current to the linear amplifier thereby to achieve the constant potential driving technique more certainly. It is most desirable to minimize the influence of the bias current where an input section of the linear amplifier is implemented with bipolar transistors and the input bias current is in the order of several $\mu A$.

BRIEF DESCRIPTION OF THE DRAWINGS

Other objects and novel features of the present invention are set forth in the appended claims and mode of operation will best be understood from a consideration of the following detailed description of the embodiments taken in conjunction with the accompanying drawings, wherein;

DETAILED DESCRIPTION OF THE INVENTION

Figure 1:
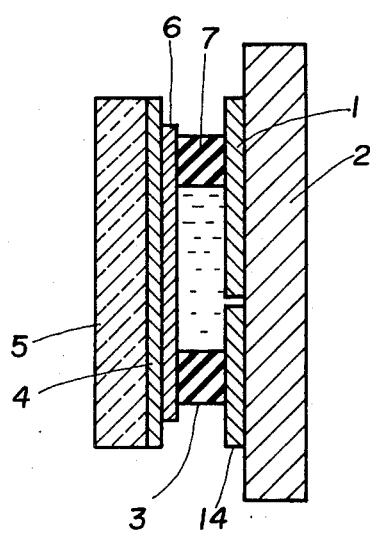
FIG. 1 is a cross sectional view of an ECD used with the present invention.

Attention is first called to FIG. 1 of the drawings which illustrates a scheme of an ECD. This scheme includes a pair of transparent electrodes 1, 4, a pair of glass supports 2, 5, spacing and sealing resin 3, a deposited thin layer of transition metal oxide (for example, $WO_3$), and an electrolyte 7. It will be noted that the illustrative ECD includes a reference electrode 14 available for the constant potential driving technique. The electrode 1 and the support 2 form a counter or opposing electrode. In the case of the reflection type of an ECD, the electrode 1 may be made of carbon or appropriate precious metal material such as platinum and palladium. The electrode 4 and the support 5, on the other hand, form a display electrode which may be segmented in a desired pattern. The reference electrode 14 may be made of the same material as the transparent electrode 1. Details of the present invention will be described in terms of an application to a vehicle speed meter with reference to FIGS. 2 and 3. A permanent magnet 15 is secured for rotation on the rear axle shaft or the propeller shaft of a vehicle. A coil 16 is provided to sense rotation of the magnet 15 and derive an output which in turn is to be applied to an amplifier 17 and a NAND/Schmitt trigger 18 for wave-shaping purposes. A converter 19 is the so-called counter that converts the output pulses from the NAND/Schmitt trigger 18 into a desired number of pulses within a cycle consisting of three synchronizing pulses $Cl_1$, $Cl_2$ and $Cl_3$ to be described later. For example, when the vehicle is running at a speed of 1 km/h, the counter 19 will provide 50 pulses from the outputs of the NAND/Schmitt trigger 18. An AND gate 20 discontinues application of an input to a decimal counter 21 when the pulses $Cl_1$ and $Cl_2$ are both high. Decimal counters 22 and 23 are similar to the above noted decimal counter 21 with an exception that they are one incremented when the input CI thereof is changed high. These outputs a, b, c, d, e, f, and g are seven segment enabling signals suitable for a well known seven segment font. The enabling signals at a high level means the generation of a coloring voltage while the ones at a low level means the generation of a bleaching voltage. A carry CO assuming a high level is developed as an input to a specific stage counter when the count of the preceding stage counter is changed from "9" to "0". Terminals RBI and RBO are provided to suppress any visual display of spurious zeros. Those counters may be implemented with commercially available integrated circuits such as CD 4033A by RCA. Though the three digit counter series 21 through 23 is employed in the given example, it is obvious that more or less digit counter series can be employed as occasion may occur.

Figure 3:
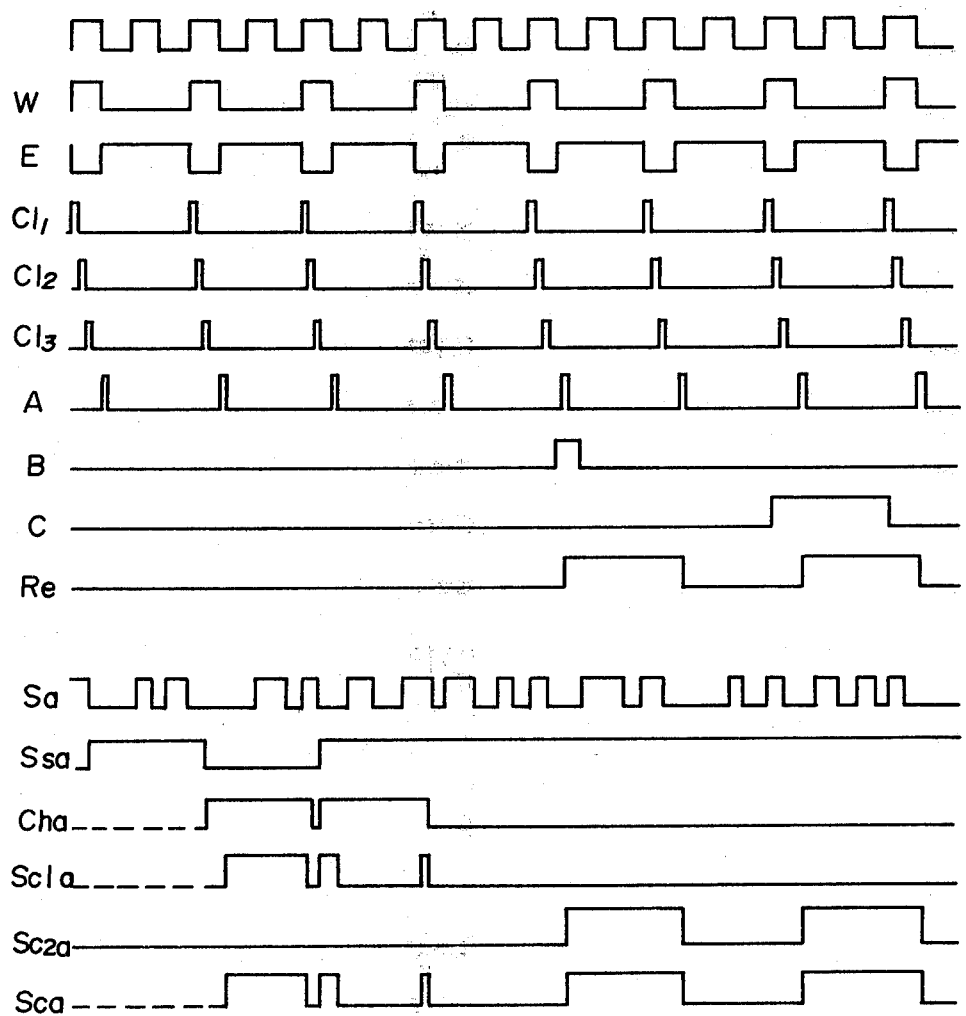
FIG. 3 is a time chart showing a variety of signals occurring within the circuit shown in FIG. 2.

A generator labeled 35 through 45 is adapted to generate timing pulses useful in displaying the speed of the vehicle. A standard generator 35 provides a pulse standard which is then applied to a multi-stage ripple counter 36. Two outputs $Q_1$ and $Q_2$ are transferred from the multi-stage ripple counter 36 to a NOR gate 37 to develop a write signal W. The pulse width of the write signal W should be long enough to complete the coloring mode of the ECD. It is desirable that the pulse width of the write signal be in the order of several 100 msec through 1 sec. A bleaching signal E is equal to the write signal W but with phase inversion. It is desirable that the width of the bleaching signal E be 0.5 sec through several sec long. A circuit 38 is provided to sense the leading edge and trailing edge of the bleaching signal E, thereby developing an output A representative of the leading edge and a second output $Cl_1$ respresentative of the trailing edge. A circuit 39 develops pulses $Cl_2$ in response to the trailing edge of the above described signals $Cl_1$ while a circuit 40 develops pulses $Cl_3$ in response to the trailing edge of the signal $Cl_2$. These signals W, E, $Cl_1$, $Cl_2$ and $Cl_3$ are shown in FIG. 3. An externally provided strobe switch 41 is turned on in refreshing the display of the ECD. A timer circuit 42 develops a strobe signal and repeats the refreshing of the ECD periodically at and desired time intervals, for example, each half an hour or each hour. The timer circuit 42 receives the bleaching signal E and derives the output C of which the period is half an hour or an hour long and the pulse width is equal to the period of the coloring and bleaching signals E and W. The output C is changed from high to low or from low to high at the trailing edge of the bleaching signal E. A block 44 develops a refleshing signal Re and includes an R-S type flip flop 45. As is clear from FIG. 3, the refreshing signal Re is changed to a high level when the switch 41 is turned on and the output B is at a high level or when the signal C is high and the signal A is changed high. Such transition is in agreement with the leading edge of the bleaching or erase signal E. Transition of the refreshing signal Re to a low level occurs in agreement with the leading edge of the bleaching signal E if the switch 41 is turned off or the pulse C is low and the pulse A is high.

Although the ECD can be advantageously held in the colored or bleached state as long as it is held in the electrically opened state, the degree of coloring of the colored segment or segments will, in fact, recede or a bleached segment or segments will be inadvertently colored to some extent by light exposure and so forth because of difficulties in assuring the electrically opened state of the ECD. For this reason it is necessary to refresh the ECD at an appropriate interval of time to compensate for incompleteness of the memory functions thereof. More specifically, a colored segment or segments should be bleached completely once and thereafter colored again, whereas a bleached segment or segments should be rebleached. To this end the leading edge of the refreshing signal Re should coincide with the leading edge of the erase signal E and the trailing edge thereof should coincide with the leading edge of the write signal W after completion of the coloring mode, that is, the leading edge of the erase signal E.

Figure 2:
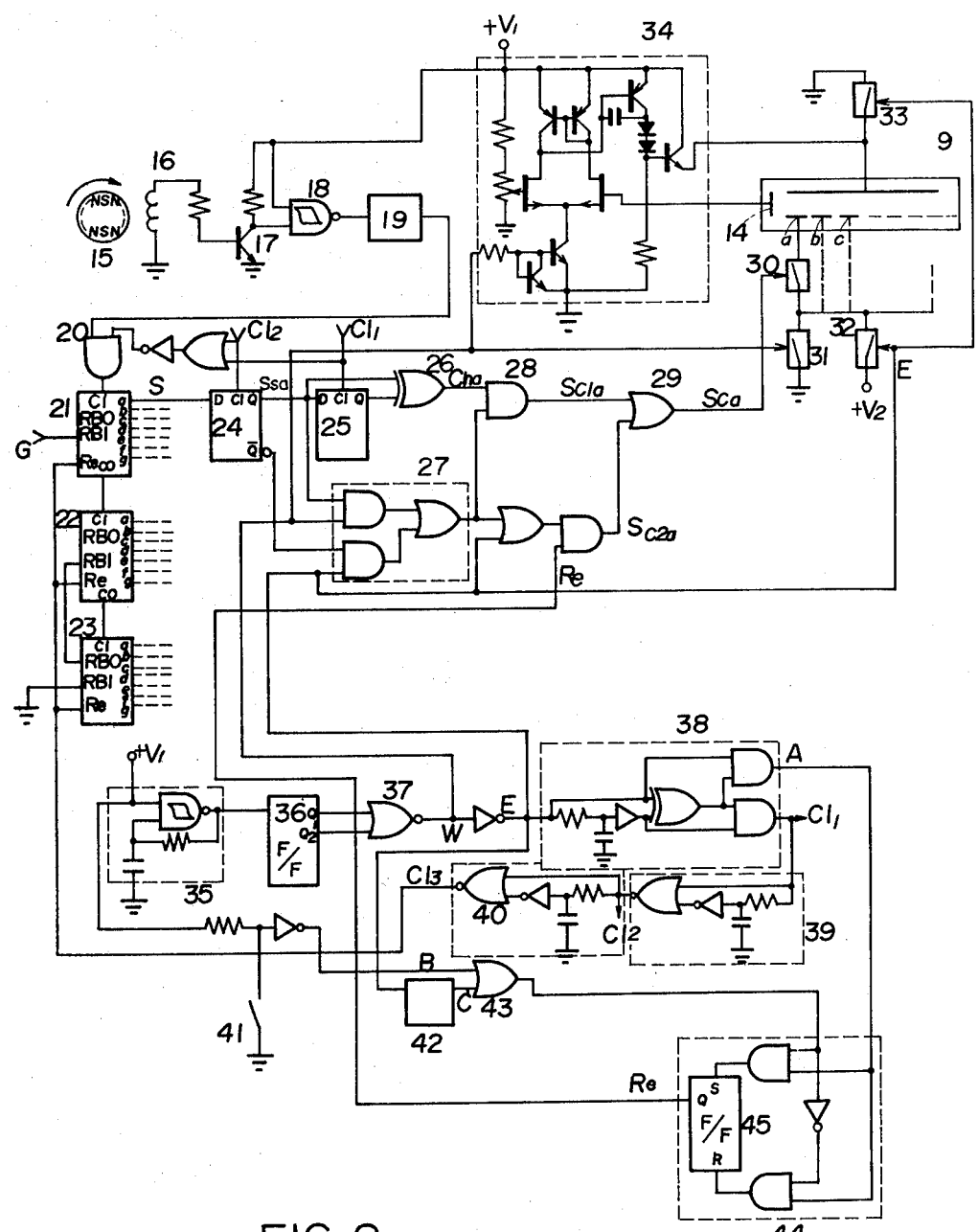
FIG. 2 is a circuit diagram of an ECD driver circuit embodying the present invention.

The pulse width of the signals $Cl_1$, $Cl_2$, and $Cl_3$ is depicted on an enlarged scale in FIG. 2 to make the relationship therebetween clear. As a matter of fact, the pulse width of these signals is negligibly short enough as compared with the pulse width of the write signal W and the erase signal E, several $\mu$sec through several 100 $\mu$sec, for example.

The signal $Cl_3$ resets the counters 21 to 23 at a fixed interval of time. The counts of these counters 21 to 23 immediately before resetting indicate the speed of the travelling vehicle. The signal $Cl_1$ and $Cl_2$ are clock pulses for D-type flip flops 24 and 25. One of the segment signals Sa from the counters is loaded into the two D-type flip flops 24 and 25 in response to the signals $Cl_1$ and $Cl_2$ which precede the signal $Cl_3$. The oitpt Ssa of the flip flop 24 appears at the output node of the flip flop 25, while one of the outputs Sa of the counter 21 appears at the output node of the flip flop 24. Since the output of the flip flops 24 and 25 are led into an exclusive OR gate 26, the output Cha of the exclusive OR gate 26 is changed high when the travelling speed varies and the segment a is turned to the colored state or the bleached state, and is held at a low level when no change is caused in the state of the ECD. A block 27 allows the write signal W to pass when the signal Ssa is high and allows the erase signal E to pass when the same is low. The output of the block 27 and the signal Cha turn an analogue switch 30 on and off via an AND gate 29. Circuits 24 to 28 are provided for respective ones of the segments to color and bleach their associated segment only when changes are needed. One of these circuits 24 to 28 is shown in FIG. 2 for illustration purposes only.

The write signal W renders an amplifier 34 operative and turns a second analogue switch 31 on. Simultaneously, the signal Sca turns the analogue switch 31 on to color the segment a in the constant potential driving manner. When the erase signal E is developed, analogue switches 32 and 33 are turned on and ready for supply of reverse current so that bleaching current flows through the segment for which the segment switch is in the on state, thereby achieving the bleaching mode in the constant voltage driving manner. A NOR'ed output of the signal Cl$_1$ and Cl$_2$ is applied to the gate 20. This prevents the contents of the counters 21 to 23 from varying when the flip flops 24 and 25 are to be changed. The signal S$_{c2a}$ is changed high in refreshing the ECD. The bleaching signal E and coloring signal W are developed when the signal Ssa is high, and only the bleaching signal E is developed when the signal Ssa is low. These signals control the switch 30 via the gate 21. It is quite effective that the above described driving technique for ECDs having a slower response which colors or bleaches a segment or segments requiring a change in the displayed state, is used to display the speed of a vehicle. This is because a change in the displayed state occurs at the least significant digit position most frequently and the memory functions of ECDs can be utilized at the more significant digit positions. 10 km/h and 100 km/h, on speed display. In addition, all the display digits never disappear in this case.

Figure 4:
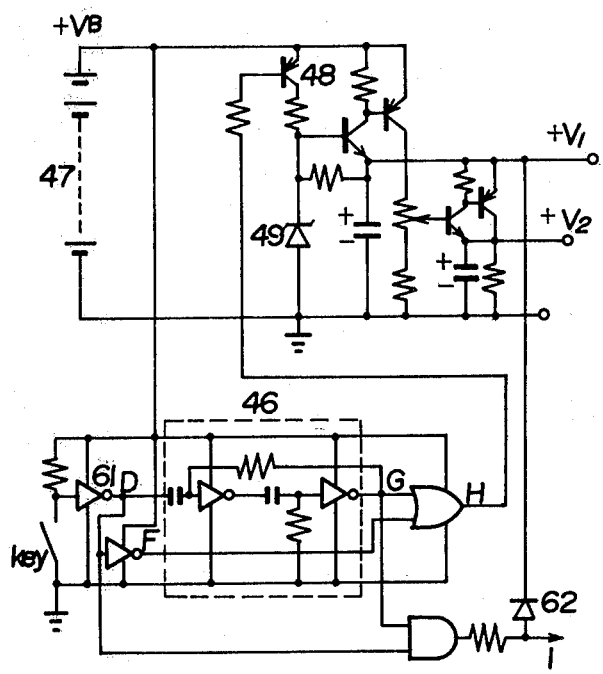
FIG. 4 is a circuit diagram of a power supply for the ECD driver circuit of the present inventon.
Figure 5:
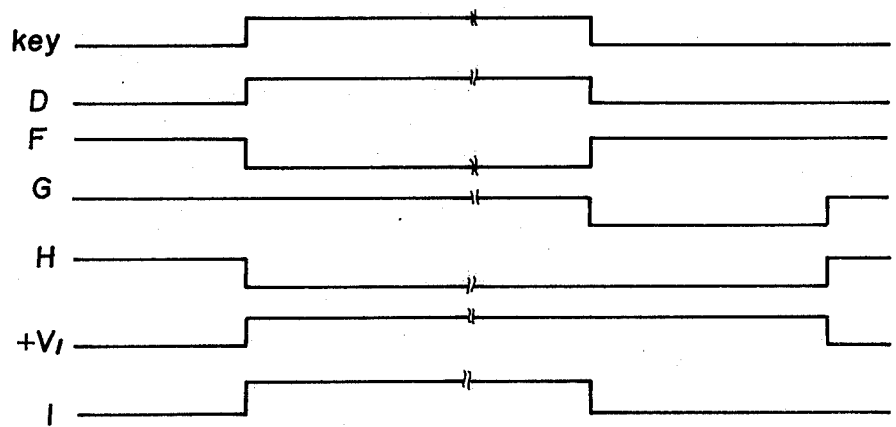
FIG. 5 is a time chart associated with the power supply shown in FIG. 4.

The following sets forth an engine "key" used in starting and stopping the vehicle referring to FIGS. 4 and 5. A block 46 of FIG. 4 is a monostable multivibrator which is triggered in response to the trailing edge of an output D of an inverter 61. The output of the multivibrator is changed low concurrently with the trigger action and restored high shortly thereafter. A battery loaded on the vehicle is labeled 47 of which the voltage is +V$_B$. A transistor switch 48 is responsive to a signal H. It is turned on when the signal H is low. The output voltage +V$_1$ (for example, 5 V) stabilized by a Zener diode 49 corresponds to the supply voltage in FIG. 2. A higher voltage is better so as to reduce the on resistance of the analogue switches. An output voltage +V$_2$ is one that is derived from the output voltage +V$_1$ (for example, about 2 V). This output voltage is a power source available for the constant voltage bleaching manner. With respect to FIG. 3, the above mentioned high level corresponds to the output voltage +V$_1$ and the low level corresponds to the ground potential. The high level shown in FIG. 5 corresponds to the voltage +V$_2$ and the low level corresponds to the ground potential. However, only the high level of the node I is clamped to the voltage +V$_1$. This is because the node I is connected to a ripple braking input RBI of the counter 21 of FIG. 2. In FIG. 5, the engine key in the on state is represented by a high level and the same in the off state is represented by a low level.

When the engine key is off, the node H is at a high level so that the circuit of FIG. 2 is supplied with no voltage. When the engine key is turned to the on state, the node H is increased to a high level so that the circuit of FIG. 2 is enabled with the source voltage +V$_1$ to enter into the operative state. At this moment the node I is changed from a low level to a high level so that, if the vehicle is stationary, the counter 21 provides the seven segment signals a through g for displaying "0". Therefore, the least significant digit of the ECD corresponding to the counter 21 provides a visual display of "0". In the event that the initial display is not satisfactory, the switch 21 of FIG. 2 is manually operated to raise the node B to a high level thereby to refresh the visual display of "0". It is easier to provide an additional circuit which renders the node B high during a desired period of time exceeding at least the cycle of the write signal W and thereafter renders the same low. This eliminates the necessity for the above noted manual refleshing operation immediately after throw of the engine key.

The driver turns off the engine key after the vehicle has been stopped. At this moment the node D drops to a low level and the output node G of the multivibrator 46 drops to a low level. For this reason the node I is at a low level even when the block 46 is operating and the node G is at a low level after turning off of the engine key. Accordingly, the circuit of FIG. 2 continues operating. However, since the node I is held at a low level at a moment when the key is turned off, all of the outputs a through g of the counter 21 are decreased to a low level. Provided that the period of time where the node G is at a low level is twice as long as the period of the bleaching signal E, the circuit of FIG. 2 is completely disabled after all the segments of the ECD speed meter have been bleached. Details of the combined constant potential and constant voltage driving technique will be described. As noted earlier, a linear amplifier 34 shown in FIG. 2 is needed to achieve the constant potential driving manner in the coloring mode. A well known function type FET is employed at the input portion of the linear amplifier 34 so as to reduce the input bias current. A common mode rejection radio is enhanced by employing a differential amplifier 34 where a transistor is connected to the source of the above FET to utilize the fact that the source potential of the FET is higher than the gate potential. The single power source +V$_1$ is for example 5 V. At the output portion of the linear amplifier, the output of an emitter follower is employed to restrict the maximum amplitude to about 3 V together with a pair of diodes. Moreover, this can provide large output current in one direction. The amplifier 34 is available only in the coloring mode. The linear amplifier is particularly desirable to the present invention where the voltage applied via a variable resistor to a positive input thereto is positive and output current flowing into the counter electrode is unidirectional.

In the coloring mode, the constant current source transistor connected to the source of the FET is rendered operative and the analogue switch 31 is turned on in response to the write signal W. The segment switch or switches for the segment or segments desired to be colored, for example, 30 is turned on in synchronization with the write signal W. Therefore, pursuant to the constant potential driving technique, the particular segment or segments are colored with a positive potential determined by a variable resistor which is available for establishing a potential at the reference electrode.

On the other hand, in the bleaching mode, the bleaching signal E turns on the analogue switches 32 and 33. The switch 32 is connected to the constant bleaching voltage +V$_2$ (about 2 V), while the counter electrode 9 is grounded. The segment switch or switches, for example, 30, the segment or segments desired to be bleached are turned on in synchronization with the bleaching signal E. If it is desired to keep the displayed state of the ECD, all the analogue switches 30 to 33 are turned off. The signal W is reduced to a low level to render the amplifier 34 non-operable.

While only certain embodiments of the present invention have been described, it will be apparent to those skilled in the art that various changes and modifications may be made therein without departing from the spirit and scope of the invention as claimed.

We claim:

1. A method for driving an electrochromic display cell to exhibit electrochromic phenomenon at said display cell, said display cell including a counter electrode, a plurality of display electrodes and a reference electrode, said method comprising the steps of:

driving said electrochromic display cell by maintaining a constant potential at respective ones of said display electrodes relative to said reference electrode when it is desired to color said respective ones of said display electrodes despite variations in the amount of energizing current supplied to said counter electrode in response to increases and decreases in the number of said display electrodes having their display states changed thereby maintaining the degree of coloration of said respective ones of said display electrodes uniform; and driving said electrochromic display cell by maintaining a constant voltage between said display electrodes and said counter electrode when it is desired to bleach said respective ones of said display electrodes thereby maintaining the degree of bleaching of said respective ones of said display electrodes uniform.

2. The method as set forth in claim 1, wherein said constant potential between said respective ones of said display electrodes and said counter electrode is maintained by connecting a high gain, linear amplifier to said reference electrode and to said counter electrode;

wherein said reference electrode senses the potential at said respective ones of said display electrodes relative to said counter electrode; and wherein said high gain linear amplifier drives said counter electrode in accordance with the potential between said counter electrode and said respective ones of said display electrodes as sensed by said reference electrode thereby maintaining the potential between said display electrodes and said counter electrode constant.

3. A method for driving an electrochromic display cell including a counter electrode, one or more segment electrodes, a layer of electrochromic materials sandwiched between the counter electrode and the segment electrodes and a reference electrode, said method comprising the steps of:

supplying current from said counter electrode to said segment electrodes while the segment electrodes are held at a fixed potential relative to said reference electrode, when it is desired to color said segment electrodes, said potential at said segment electrodes being held fixed despite variations in the amount of energizing current supplied to said counter electrode in response to increases and decreases in the number of said segment electordes having their display states changed; and supplying current from said segment electrodes to said counter electrode while the segment electrodes are held at a fixed voltage relative to said counter electrode, when it is desired to bleach said segment electrodes.

4. The method as set forth in claim 3 wherein current is supplied from said counter electrode to respective ones of said segment electrodes undergoing a change in display state.

5. A display system for displaying parameters on a display indicative of the movement of an object, comprising:

a signal generator means for generating output signals, the number of said output signals being representative of the movement of said object;

a counter means for providing a count indicative of the number of said output signals received from said signal generator means;

a readout circuit means responsive to an output signal from said counter means for reading the count of said counter means and generating a plurality of display segmented output signals representing an accumulated reading of said counts generated by said counter means and indicative of the movement of said object, said plurality of display segmented output signals being responsible for forming a display segmented pattern on said display;

circuit means for developing a write signal and an erase signal;

memory means responsive to said display segmented output signals from said readout circuit means for generating an energizing signal in response to said display segmented output signals from said readout circuit means; and control circuit means responsive to said energizing signal, to said write signal and to said erase signal for coloring said display in response to the generation of said write signal, and for bleaching said display in response to the generating of said erase signal, said control circuit means thereby detecting whether a change is required to the display state of said display segmented pattern on said display;

wherein said display of said display system further comprises;

an electrochromic display including a counter electrode and a plurality of display electrodes, said display electrodes manifesting coloring phenomenon in response to the application of current supplied thereto; and wherein said control circuit means further comprises:

switch means connected to said counter electrode and said display electrodes for switching the direction of current to be supplied to said electrochromic display from a first direction to a second direction in response to energization of said switch means by said write signal and from said second direction to said first direction in response to energization of said switch means by said erase signal, respectively.

6. The display system as set forth in claim 5, wherein the number of said output signals generated by said signal generator means is representative of the traveling speed of a vehicle.

7. A display system, comprising:

an electrochromic display cell including a plurality of display electrodes, a reference electrode, and a counter electrode, said cell having an electrochromic material sandwiched between said plurality of display electrodes and said counter electrode;

a constant potential driving circuit means responsive to an output signal from said reference electrode for sensing the voltage potential between said reference electrode and said plurality of display electrodes and for energizing said counter electrode in accordance with the potential sensed between said reference electrode and said plurality of display electrodes thereby maintaining the potential between said counter electrode and said plurality of display electrodes at a fixed volue, said potential between said plurality of display electrodes and said counter electrode being maintained fixed despite variations in the amount of energization current supplied to said counter electrode in response to increases and decreases in the number of said display electrodes having their display states changed, said constant potential driving circuit means applying a varying voltage of a first polarity to said counter electrode of said electrochromic display cell in response to the potential sensed by said reference electrode thereby supplying current to said display cell in a first direction adapted to color respective ones of said plurality of display electrodes and adapted to maintain the potential between said counter electrode and said respective ones of said display electrodes at a fixed value; and a constant voltage driving circuit means for applying a fixed voltage of a second polarity opposite to said first polarity to said respective ones of said display electrodes of said electrochromic display cell thereby supplying current to said display cell in a second direction opposite to said first direction adapted to uniformly bleach said respective ones of said plurality of display electrodes, said reference electrode being disconnected during bleaching of said display electrodes.

8. A display system in accordance with claim 7 wherein said constant potential driving circuit means comprises:
  pulse generating means for generating a plurality of write pulses;
  wherein said reference electrode senses the potential between said counter electrode and respective ones of said plurality of display electrodes and generates a sensed signal indicative of the said potential;
  high gain linear amplifier means responsive to said sensed signal and to said pulse generating means for generating an energizing signal in accordance with said sensed signal received from said reference electrode and with one of said write pulses received from said pulse generating means, said energizing signal energizing said counter electrode in accordance with said sensed signal thereby maintaining the potential between said counter electrode and said plurality of display electrodes at a fixed value, the potential between said counter electrode and said plurality of display electrodes being maintained at a fixed value despite variations in the amount of energizing current supplied to said counter electrode via said energizing signal.

9. A display system in accordance with claim 8 wherein said constant voltage driving circuit means comprises:
  a source of positive voltage supply;
  first switch means connected to said positive voltage supply on one end and to said plurality of display electrodes on the other;
  second switch means connected to said counter electrode on one end and to ground potential on the other end;
  said second switch means being electrically connected to said first switch means;
  wherein said pulse generating means generates a plurality of erase pulses; and
  said first and second switch means are closed in response to energization by one of said plurality of erase pulses thereby applying a fixed potential equal to the potential supplied by said source of positive voltage supply between said respective ones of said plurality of display electrodes and said counter electrode.

* * * * *